United States Patent Office 3,458,290
Patented July 29, 1969

3,458,290
PROCESS FOR THE RECOVERY OF METAL VALUES BY SELECTIVE FIXING IN AN AQUEOUS PHASE
Ake Valdemar Hultgren, Nykoping, Sweden, assignor to Aktiebolaget Atomenergi, Stockholm, Sweden, a company of Sweden
No Drawing. Filed July 23, 1965, Ser. No. 474,501
Claims priority, application Sweden, Aug. 13, 1964, 9,784/64
Int. Cl. C01g 57/00
U.S. Cl. 23—337                              12 Claims

ABSTRACT OF THE DISCLOSURE

A valuable substance, e.g. fissionable material, is recovered from a primary solution thereof in an organic solvent—the solution containing also an amine—by practicing a modified form of distributional chromatography, in which the primary solution is passed through a packed column wetted by an aqueous solution containing a fixing compound, said primary solution and said aqueous solution being substantially insoluble in each other. The fixing compound is selected, with reference to the valuable substance, so that the two form a compound which is substantially insoluble in the primary solution and is retained on the column.

---

The invention relates to separation or recovery of valuable substances, especially certain metal or metal compounds, from diluted solutions of substances in an organic solvent, in order to obtain the valuable substance in concentrated form. More particularly the present invention relates to a novel process for the extraction of one or more desired substances from such primary solution in an organic solvent with the aid of an aqueous solution.

Such primary solutions are, for example, to be found in the processing of nuclear reactor fuel elements. Especially decladding and dissolution of spent uranium fuel elements, are usually carried out by the aid of sulphuric acid, in the case of steel cladding and nitric acid, respectively, an acid aqueous solution of uranium and plutonium together with various fission products is obtained, in case of decladding due to a non-desired dissolution of the fuel core. According to conventional practice such a solution is extracted with a suitable organic solvent for the valuable substance or substances, whereby (according to the terminology used herein) a primary solution is obtained. As organic solvents different substances and combinations of substances have been suggested. In the case of the recovery of plutonium from a decladding solution, the primary solution may contain a primary amine, whereas in the case of the recovery of plutonium from the dissolved fuel core, it may contain a tertiary amine, such as tri-n-octylamine or tri-n-laurylamine (TLA), and in the case of recovery (decontamination) of the uranium as well, the primary solution may contain tributylphosphate. For the separation or recovery of the valuable plutonium from such a solution this solution has, according to known methods, been extracted in conventional extraction apparatus with an aqueous solution of one kind or the other, in the case of decladding with diluted nitric acid and in case of recovery of the fuel core with acetic acid or a reducing solution of ferrous sulfamate. In certain cases this extraction technique has been combined with an anion exchange for the final purification of the plutonium. Regarding this known extraction technique reference may, for example, be made to U.S. Patents Nos. 3,046,087 and 3,047,360 and British Patent 880,919, and regarding ion exchange British Patent 910,443 is referred to. Another known method, which is based upon the fact that the valuable substance or a compound thereof distributes differently between two immiscible solvents, consists in extraction of the organic solution with a solvent which is absorbed on a fine-grained material in an extraction column, said solvent being such that the distribution coefficient between the solvents for plutonium is substantially higher than for uranium, see for example my British Patent No. 841,602.

According to the present invention, on the other hand, the primary solution is passed through a column of fine-grained, solid material, such as silica gel, diatomaceous earth, bentonite or the like or cellulose products for chromatography, which is chemically and radiolytically resistent against the substances present in the process and upon which an aqueous solution is absorbed, the primary solution and the aqueous solution being sufficiently insoluble in each other to form separate phases, said aqueous solution containing a substance or a chemical compound, which together with the valuable substance, possibly by precipitation, oxydation or reduction, gives rise to the formation of a compound, which may be a complex and which is sufficiently insoluble in the primary solution to remain in the aqueous solution in the column, from which it may be eluted with a liquid which dissolves the sparingly soluble compound or a reaction product thereof comprising the valuable substance. The fixing substance in the aqueous solution should be present in a concentration which at least corresponds to the amount of valuable substance to be fixed in the column and sufficient excess to ensure satisfying fixing during the recovery.

In case of fuel elements the object of the process is thus to recover plutonium in the form of a concentrated solution from diluted product or waste solutions containing plutonium, and at the same time to purify said plutonium from contaminations such as corrosion and fission products. By this process a valuable product is obtained and moreover the handling of the waste, which has been freed from plutonium, is simplified.

From a principle point of view the problem is thus to select a compound among the compounds of the valuable substance which is soluble in an organic solvent immiscible with water or aqueous solutions, and which may be converted into a compound sparingly soluble or insoluble in said organic solvent by the aid of an agent, which is comprised in, can be dissolved, or in another way taken up in said aqueous phase, but not or only to a low degree, in said organic solvent. As a rule such compounds can be found rather easily in handbooks and collection of tables or in other literature. However, it is often possible to find suitable combinations of compounds and working conditions by the aid of solubility tests. Especially the adjustment of the acidity of the solutions in question is an essential expedient for the control of the state of solubility at the extraction from the original solution into the primary solution as well as from the primary solution into the absorbing aqueous phase.

Different amines, such as aliphatic, alicyclic and possibly also aromatic, primary, secondary and tertiary amines as well as quaternary ammonium compounds are known to be good extraction agents for actinide elements, usually in their quadrivalent condition, which partly appears from the patents set forth above. Also certain other elements such as technetium and molybdenum may be extracted with compounds belonging to these groups, for example trilaurylamine.

In order to illustrate the invention in detail the recovery according to the invention of plutonium from solutions obtained by dissolution of uranium fuel may be described.

An element of uranium dioxide ($UO_2$) having for example about 0.4 millimeter thick steel cladding, may be used. The decladding is carried out by cooking the element in 4–6 molar sulphuric acid, which results in a solution, which may be 0.6 molar with regard to the sulphates of the steel metals, i.e. iron, chromium, nickel, or contains in the order of magnitude 30–40 grams of the steel metals per liter, 4 grams per liter of uranium, 10 milligrams per liter of plutonium and about 10 milligrams per liter of fission products. This solution thus has a very low concentration of Pu.

Another example is the dissolution of the fuel core itself. A highly burnt-up uranium fuel, which consequently has a relatively high concentration of plutonium, is dissolved in 6–12 molar nitric acid. A 2–3 molar nitric acid solution containing, by way of order of magnitude, about 300 grams per liter of uranium, 1 gram per liter of plutonium, 2 grams per liter of aluminium and 1 gram per liter of fission products is obtained.

Such a nitric acid solution is extracted in conventional way with a 10% solution of trilaurylamine in tertiary butyl-benzene whereby a solution containing, by way of order, about 2 mg. per liter of uranium, 1 g. per liter of plutonium, no aluminium and a certain amount of fission products is obtained.

The solution thus obtained with trilaurylamine (TLA) from a nitric acid solution, the TLA-solution is passed through a silica gel column, which has been prepared in the following way to become suitable for the recovery of plutonium and the like. The silica gel is packed in deionized water (water that has been purified with the aid of ion exchangers), and an aqueous solution containing a plutonium fixing agent, for example a substance yielding sulphate ions, such as ammonium sulphate or hydroxylamine sulphate, optionally together with diluted nitric acid, is passed through said column, after which the excess of said solution is expelled from the column, preferably with the aid of pure TLA solution (10% TLA in tertiary butylbenzene), there being retained in the column, absorbed on the silica gel therein, a stationary aqueous phase containing the active agent. This phase con constitute about 40% of the volume of the column. The solution may preferably be saturated or almost saturated with regard to said agent. Suitable approximate concentrations for said sulphates are 4 molar ammonium sulphate and 2 molar hydroxylamine sulphate. If there is nitric acid in said solution the concentration thereof should not exceed 1 molar and the sulphate concentration should exceed that of the nitric acid. When the Pu–TLA solution enters into the column, Pu distributes into the stationary aqueous phase and the moving TLA solution. The plutonium which has passed through the interface into the aqueous phase, however, immediately forms Pu(IV) sulphate complex of the $Pu(SO_4)_n^{4-2n}$ type, $n$ being as a rule 2 to 4. In the case of hydroxylamine sulphate there is also a gradual reduction of Pu(IV) to Pu(III), which forms sulphate complex of the $Pu(SO_4)_n^{3-2n}$ type, $n$ being as a rule 2 to 4. Since the Pu(IV) sulphate complex and still more the Pu(III) sulphate complex has an extremely small tendency to pass over anew to the moving TLA-phase, the plutonium is fixed in the aqueous phase in the column and is moving extremely slowly in the direction of the TLA stream. The separation from the impurities takes place partly in the extraction stage, which precedes the separation in the silica gel column and in which the plutonium is transferred to the TLA phase and is freed from impurities, which cannot be extracted by this amine solution, and partly in the silica gel column, where the plutonium is freed from extractable impurities, which are not fixed in the silica gel column together with plutonium.

In the plutonium fixing stage the temperature is preferably somewhat increased, for example to about 40° C., because in this way a more rapid phase transfer and in turn a lower leakage of plutonium is obtained. By the use of a sort of silica gel having relatively coarse pores, for example an average pore diameter of 75 A., the same trend is obtained. It is suitable to pass organic solutions from the top dawnwardly and aqueous solutions from the base upwards in the column.

In tests carried out in a 1 centimeter diameter by 10 centimeters long column packed with 0.47 g./cm.$^3$ of 30–50 mesh silica gel the following results have been obtained. The column was charged by the supply of 2 bed volumes (each about 10 cm.$^3$) of an aqueous solution of 0.5 molar nitric acid and 2 molar hydroxylamine sulphate and supersession with 2 bed volumes of a 10% solution of trilaurylamine (TLA) in tertiary butyl-benzene. A primary solution containing 0.5 milligram of plutonium per liter TLA solution was treated in the column at 40° C. and a flowing through velocity of 0.9 millilitre per cubic centimeter and minute. When 800 bed volumes (that is about 8 litres) had passed through, about 4 milligrams of plutonium was kept in the column and 0.3% had leaked through as total loss. After supersession by fully one bed volume of TLA the column was eluted with totally 10 bed volumes of 1 molar nitric acid. Already the first effluent bed volume contained about 90% of the plutonium, i.e. about 3.6 milligrams, and could be separated as a final product, while the rest of the effluent bed volumes, which where poorer in plutonium, were allotted for use in a future cycle.

The concentration in the silica gel column may, in principle, be carried out until a predetermined loss level, for example 0.1%, has been obtained in the effluent. The elution from the column can then be carried out preferably with an aqueous solution of the extracting substance. Five to ten bed volumes are sufficient for the elution of the plutonium according to the above method. When the main part of the substance, which has been fixed in the column, i.e. about 90% of the plutonium in the above case, is eluated in the first bed volume, it can be separated as end product. The rest of the eluate may be used in a subsequent elution cycle, which in such case preferably is terminated with fresh elution liquid (aqueous solution).

Since more than 500 but preferably not more than 1000 bed volumes of Pu/TLA solution may pass through the silica gel column with tolerable loss of Pu a concentration factor of 500–1000 may be obtained in this way in the column stage itself. This should be compared with the obtainable concentration factor of 10–15 in re-extraction of plutonium from amine solution in conventional extraction apparatus.

In the silica gel stage Pu is freed from 90% of the fission products extracted in the preceding extraction stage.

If this process is compared with the ion exchange process it will be found that a cation exchanger gives as good a concentration but none or only an insignificant separation from impurities, while an anion exchanger may give the same concentration degree together with a certain purification but gives rise to high costs, since it requires a volume of concentrated nitric acid which is as large as the volume of the Pu-solution to be treated.

It is also possible to have oxalic acid or an oxalate, for example potassium oxalate, in the absorbing aqueous phase for fixing of plutonium, for example. Said solution may be saturated or almost saturated (about 8.0 molar oxalic acid, about 1.0 molar potassium oxalate). The capacity can be calculated to 80 bed volumes for plutonium concentrations of the order of magnitude of 10 milligrams per liter. The column is preferably eluted with a TLA solution (1 to 2 bed volumes) and the elution is preferably carried out with 8–14 molar nitric acid substantially in the way set forth above.

As an example of non-nuclear chemical substances, which can be recovered according to the invention, molybdenum may be mentioned. In this case the following procedure may be used: An original solution of 1 gram per liter of ammonium molybdate in nitric acid having a concentration of less than 0.1 molar $HNO_3$, is extracted with 10% TLA solution until the last-mentioned solution has obtained a molybdenum concentration of 1 gram per liter. The column is prepared with 10 molar nitric acid. In this case it is assumed that only 10 bed volumes of Mo–TLA solution are passed through the column. The elution is carried out with an alkali solution, for example a solution of 2 molar sodium hydroxide.

Although the invention has been described in connection with the processing of nuclear-chemical solutions it may obviously be used generally in all fields for the recovery of a substance from a diluted solution where the substance as such, an element for example, or a compound thereof, is dissolved in a primary solvent phase, and can be converted with the aid of an agent present in a secondary solvent phase which is in contact with the primary solvent phase, into a compound, which is sparingly soluble in the primary solvent phase and thus remains in the secondary solvent phase as a reaction product, such as a salt, a complex compound or a precipitate, for example. Said agent should of course be insoluble or in any case sparingly soluble in said primary solution phase.

I claim:

1. A process for separating from an organic primary solution in an organic solvent a valuable metal contained therein, comprising passing the primary solution through a column of fine-grained, solid material upon which an aqueous solution is absorbed, the primary solution and the aqueous solution being sufficiently insoluble in each other to form separate phases, said aqueous solution containing a fixing chemical compound selected to form with said valuable metal, in the stage in which it appears in said primary solution, a complex salt substantially insoluble in the primary solution so as to be retained in the column, discharging the remainder of said primary solution from the column and eluting said valuable metal in substantially the same form as when fixed in aqueous phase.

2. A process as claimed in claim 1, in which said valuable metal is in the form of a compound thereof.

3. A process as claimed in claim 1, in which said metal is a metal of the group plutonium, neptunium, uranium, thorium, molybdenum and technetium.

4. A process as claimed in claim 1, in which said fine-grained material is an adsorption material of the group consisting of silica gel, diatomaceous earth, and cellulose material.

5. A process as claimed in claim 3, in which the organic primary solution comprises an amine of the group consisting of aliphatic, alicyclic, and aromatic, primary, secondary tertiary and quaternary amines comprising 10–50 carbon atoms.

6. A process as claimed in claim 3, in which the primary solution contains plutonium and the absorbing aqueous solution contains sulphate ions, in an amount corresponding at least to the amount of plutonium to be retained in the column.

7. A process as claimed in claim 6, in which said absorbing aqueous solution contains also dilute nitric acid.

8. A process as claimed in claim 6, in which the plutonium is eluted from the column with dilute nitric acid.

9. A process for separating from an organic primary solution a valuable metal contained therein, said metal being a member of the group consisting of plutonium, neptunium, uranium, thorium, molybdenum and technetium and said primary solution comprising an amine selected from the group consisting of aliphatic, alicyclic and aromatic, primary, secondary, tertiary and quaternary amines containing 10–50 carbon atoms, in solution in a hydrocarbon solvent therefor, comprising passing the primary solution through a column of fine-grained, solid material upon which an aqueous solution is absorbed, the primary solution and the aqueous solution being sufficiently insoluble in each other to form separate phases, said aqueous solution containing a fixing chemical compound selected to form with said valuable metal a compound substantially insoluble in the primary solution so as to be retained in the column, discharging the remainder of said primary solution from the column, and eluting said valuable metal in substantially the same form as when fixed in aqueous phase.

10. A process for separating from an organic primary solution a valuable metal contained therein, said metal being plutonium and said primary solution comprising an amine selected from the group consisting of aliphatic, alicyclic and aromatic, primary, secondary, tertiary and quaternary amines containing 10–50 carbon atoms, in solution in a hydrocarbon solvent therefor, comprising passing the primary solution through a column of fine-grained, solid material upon which an aqueous solution containing oxalic acid is absorbed; the primary solution and the aqueous solution being sufficiently insoluble in each other to form separate phases, said aqueous solution containing a fixing chemical compound selected to form with said valuable metal a compound substantially insoluble in the primary solution so as to be retained in the column, discharging the remainder of said primary solution from the column, and eluting said plutonium with 8–14 molar $HNO_3$.

11. A process for separating from an organic primary solution a valuable metal contained therein, said metal being plutonium and said primary solution comprising an amine selected from the group consisting of aliphatic, alicyclic and aromatic, primary, secondary, tertiary and quaternary amines containing 10–50 carbon atoms, in solution in a hydrocarbon solvent therefor, comprising passing the primary solution through a column of fine-grained, solid material, upon which there is absorbed an aqueous solution of a sulphate, selected from the group consisting of ammonium sulphate and hydroxylamine sulphate, in an amount corresponding at least to the amount of plutonium to be retained in the column, the primary solution and the aqueous solution being sufficiently insoluble in each other to form separate phases, said aqueous solution containing a fixing chemical compound selected to form with said valuable metal a compound substantially insoluble in the primary solution so as to be retained in the column, discharging the remainder of said primary solution from the column, and eluting said valuable metal in substantially the same form as when fixed in aqueous phase.

12. A process for separating from an organic primary solution a valuable metal contained therein, said metal being molybdenum or technetium and said primary solution comprising an amine selected from the group consisting of aliphatic, alicyclic and aromatic, primary, secondary, tertiary and quaternary amines containing 10–50 carbon atoms, in solution in a hydrocarbon solution therefor, comprising passing the primary solution through a column of fine-grained, solid material upon which there is absorbed an aqueous solution containing nitric acid of a molarity of at least six, the primary solution and the aqueous solution being sufficiently insoluble in each other to form separate phases, said aqueous solution containing a fixing chemical compound selected to form with said valuable metal a compound substantially insoluble in the primary solution so as to be retained in the column, discharging the remainder of said primary solution from the column, and eluting said metal with an aqueous alkaline solution of 1–5 molar NaOH.

References Cited

UNITED STATES PATENTS

| | | | |
|---|---|---|---|
| 2,717,696 | 9/1955 | Schubert | 23—337 X |
| 2,728,633 | 12/1955 | Arden et al. | 23—337 |
| 2,819,944 | 1/1958 | Wibbles et al. | 23—337 |
| 2,840,451 | 6/1958 | Katzin et al. | 23—338 |

BENJAMIN R. PADGETT, Primary Examiner

M. J. McGREAL, Assistant Examiner

U.S. Cl. X.R.

23—338; 210—38